United States Patent [19]
Kresse et al.

[11] Patent Number: 5,913,528
[45] Date of Patent: Jun. 22, 1999

[54] MOBILE CLEANING TROLLEY AND TRAILER

[75] Inventors: Franz Kresse, Hilden; Rainer Osberghaus, Duesseldorf; Roland Schunter, Lorch; Hans-Leo Fernschild, Korschenbroich, all of Germany

[73] Assignee: Henkel-Ecolab GmbH & Co. OHG, Duesseldorf, Germany

[21] Appl. No.: 08/702,507

[22] PCT Filed: Feb. 21, 1995

[86] PCT No.: PCT/EP95/00621

§ 371 Date: Sep. 3, 1996

§ 102(e) Date: Sep. 3, 1996

[87] PCT Pub. No.: WO95/23720

PCT Pub. Date: Sep. 8, 1995

[30] Foreign Application Priority Data

Mar. 2, 1994 [DE] Germany .............................. 44 06 749

[51] Int. Cl.⁶ ...................................................... B62B 3/02
[52] U.S. Cl. .................................... 280/47.35; 280/416.3; 280/498
[58] Field of Search .............................. 280/47.38, 87.01, 280/410, 409, 416.3, 489, 504, 498, 515, 47.35, 204, 292, 411.1; D12/97, 106; D21/135; 16/254, 260, 267, 268, 269

[56] References Cited

U.S. PATENT DOCUMENTS

| | | | |
|---|---|---|---|
| 214,932 | 4/1879 | Maier | 16/268 |
| 2,382,989 | 8/1945 | Gilbert | 280/87.04 |
| 2,555,178 | 5/1951 | Young | 280/36 |
| 3,031,207 | 4/1962 | Bard | 280/47.35 |
| 3,208,768 | 9/1965 | Hulbert | 280/409 |
| 4,986,555 | 1/1991 | Andreen | 280/47.35 |

FOREIGN PATENT DOCUMENTS 4320454  12/1994  Germany .

*Primary Examiner*—J. J. Swann
*Assistant Examiner*—Frank Vanaman
*Attorney, Agent, or Firm*—Ernest G. Szoke; Wayne C. Jaeschke; Kenneth Watov

[57] ABSTRACT

A cleaning vehicle which is suitable for holding and transporting containers and devices for the commercial cleaning and disinfection of floors and other surfaces, consists of a main vehicle with wheels and a trailer with wheels and a coupling for connecting the trailer to the main vehicle. The coupling consists of at least one tow-hook and corresponding eyes in which the hook can engage. The shape of the hook and eyes is such that the coupling allows the trailer to rotate about the connecting line of the eyes of the main vehicle and/or the vertical movement of the trailer in relation to the main vehicle, but no movement of the trailer in the plane of travel in relation to the main vehicle. The wheels of the main vehicle do not lock when taking curves and are stable even on uneven surfaces. At the same time the trailer can be properly steered by the main vehicle without any undesired movements of the trailer. The improvement is also simple and economical.

12 Claims, 3 Drawing Sheets

MOBILE CLEANING TROLLEY AND TRAILER

BACKGROUND OF THE INVENTION

1. Field of the Invention

This invention relates to a cleaning trolley suitable for accommodating and transporting containers and utensils for the institutional cleaning and disinfection of floors and other surfaces.

2. Discussion of Related Art

In the moist, wet or dry cleaning of large floor areas, a so-called cleaning, transport or equipment trolley is often used to carry buckets for the cleaning liquid and the dirty water and also floor mops, rubbish sacks and other utensils. In other known embodiments, cleaning trolleys of the type with which the present invention is concerned are used as disinfection or waste-disposal trolleys or as useful-material collectors. These trolleys are also encompassed by the invention.

Since cleaning trolleys are intended to be as small as possible for stowing when not in use while offering a large useful surface in use, it is known that trailers can be coupled to them. The main trolley and the trailer can be uncoupled after use and stowed compactly in a cleaning cupboard.

Known trailers are coupled to the main trolley by a knob which keeps the uprights in close contact.

Several trailers coupled to the front and/or rear of the main trolley in the direction of travel or several trailers coupled to one another are also possible. In the interests of simplicity, the present specification is only concerned with a trailer coupled to the rear of the main trolley in the direction of travel although the invention is by no means limited to this embodiment.

Unfortunately, the use of trailers involves several problems. When traveling around corners, the wheels of the main trolley and trailer impede one another. On uneven floors, the wheels of the trailer are lifted off the floor surface on account of the relative rigidity of the coupling in the vertical direction.

3. Summary of the Invention

Accordingly, the problem addressed by the present invention is to develop a cleaning trolley and trailer hvaing wheels which do impede one another around corners and which remain safely in contact with the floor even where it is uneven. Also, the trailer must be easy to steer from the main trolley without entering into any unwanted movements. In addition, the design of the invention must be simple and inexpensive.

According to the invention, the coupling is located between the consists of at least one coupling hook and corresponding coupling eyes in which the coupling hook is designed to engage. The shape of the coupling hook(s) and coupling eyes is such that the coupling allows the trailer to make a turning movement about the line connecting the coupling eyes of the main trolley and/or a vertical movement relative to the main trolley, but does not allow the trailer to move in the plane of travel relative to the main trolley. The subject coupling prevents the trailer from swinging out sideways in the plane of travel and uneven floors no longer lead to the problems mentioned above, and provides for precision steering of the trailer.

In a preferred embodiment, the trailer has at least two casters arranged adjacent one another in the direction of travel and at a distance from one another. The wheels of the trailer are casters for permitting the trailer to be pushed or pulled along and steered without difficulty by pushing or pulling the main trolley. However, it is also possible in accordance with the invention for the trailer to be supported by only one roller which need not be a caster.

One coupling eye and one corresponding accurately fitting coupling hook are provides one embodiment of the invention. However, two coupling eyes in each of which a coupling hook is able to engage are preferred. The trailer is unable to swing out sideways even if the combinations of coupling eyes and hooks do not fit exactly.

Horizontal movement of the trailer relative to the main trolley transversely or longitudinally of the direction of travel can be prevented by various designs of the coupling. In one particularly simple embodiment of the invention, the cross-section of that end of the coupling hook intended to engage in the coupling eye corresponds to the opening cross-section of the coupling eye so that the coupling hook fits in the coupling eye without any play. However, it is also sufficient if the distance between the mutually opposite side faces of the coupling hooks, which may also be called the "inner interval", is substantially equal to the distance between the inner faces of the coupling eyes which the side faces mentioned are opposite when the trailer is in the coupled position. In addition, in another embodiment of the invention, the distance between the remote side faces of the coupling hooks, the so-called "outer interval", may be narrower than the distance between the inner faces of the coupling eyes which are opposite those side faces in the coupled position of the trailer. The play-free fit of the coupling hooks in their eyes is guaranteed by the above-mentioned dimensioning of the inner intervals. Alternatively, if the coupling hook does not fit firmly in the associated eye, stop elements, for example, may be provided to limit movement in the plane of travel only.

The trailer can be prevented from turning relative to the main trolley in the plane of travel by providing the outer face of the coupling hook and the inner face of the coupling eye with a non-circular horizontal cross-section. In one particularly economic embodiment, the outer face of the coupling hook and the inner face of the coupling eye have an elongate horizontal cross-section. Other possibilities also fall within the scope of the invention. Examples of alternative measures include the above-mentioned stop elements and a tongue-and-groove joint between the hook and the eye.

Although the use of trailers provides the cleaning trolley with a relatively large useful surface and, at the same time, ensures space-saving stowage, the trailer does have to be coupled and uncoupled before and after use in the case of known cleaning trolleys. Another problem is the additional stowage space required for the trailer because it corresponds to the useful surface of the trailer.

In another embodiment of the invention, these disadvantages are overcome by connecting the coupling hook on the trailer to a stay of which the thickness in the vertical direction is substantially equal to the opening width of the coupling eye in the direction of travel. Alternatively, the cross-section of the stay may taper or widen conically towards the coupling hook. However, it should reach the opening width of the coupling eye in the vicinity of the coupling hook. In this way, the trailer can be folded up after use. In this position, it is no longer the outer end of the coupling hook but rather the stay which engages in the coupling eye. Since the thickness of the stay in the vertical direction is adapted to the opening width of the coupling eye, the trailer snaps in when folded up and is safely held in that position.

The preparation times are shortened because there is no need for time-consuming coupling and uncoupling of the trailer. When not in use, the trailer requires only a fraction of the original stowage space.

In a preferred embodiment of the folding trailer, the coupling hook is L-shaped, the shorter end being designed to engage in the coupling eye and pointing downwards in the unfolded position of the trailer and the longer end, the stay, being fixedly connected to the trailer. If, in this case, a groove is additionally formed in the inner face of the coupling hook between the longer end, and the shorter end and if the shape of the rear end—in the direction of travel—of the coupling eye of the main trolley is adapted to fit in the groove, the trailer on the one hand can be turned about the line connecting the coupling eyes of the main trolley and, on the other hand, can then be folded up. In addition, this embodiment can be put into practice particularly economically.

BRIEF DESCRIPTION OF THE DRAWINGS

One/several embodiment(s) of the invention is/are described in more detail in the following with reference to the accompanying drawings, in which like items are identified by the same reference designation wherein.

DETAILED DESCRIPTION OF THE INVENTION

Figure 1:
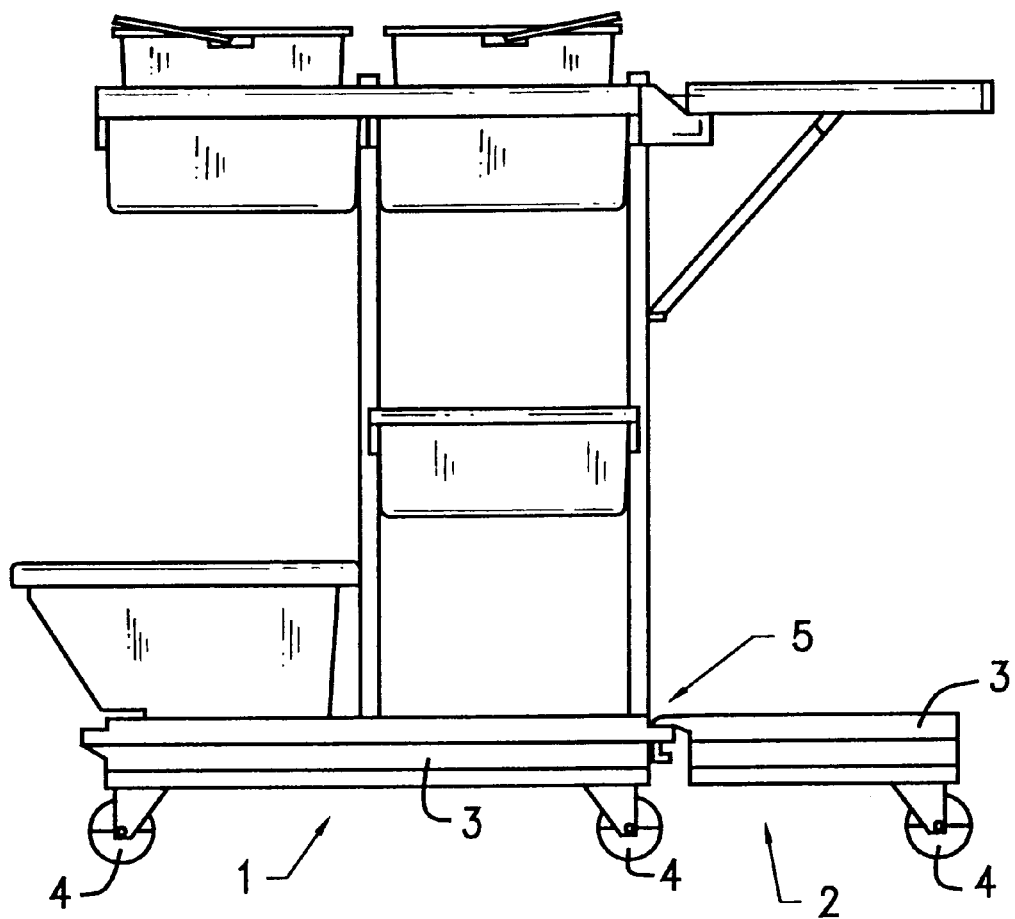
FIG. 1 is a side elevation of one embodiment of a cleaning trolley according to the invention consisting of a main trolley and a trailer.

The cleaning trolley shown in FIG. 1 consists of a main trolley 1 and a coupled trailer 2. The main trolley 1 and the trailer 2 have a chassis 3 with casters 4. In this example, the chassis 3 of the main trolley 1 supports a superstructure for the space-saving accommodation of trays and buckets. The main trolley 1 is fitted with four casters and the trailer 2 with two casters 4. The second wheel of the trailer 2 (not shown) is concealed by the first.

Figure 2:
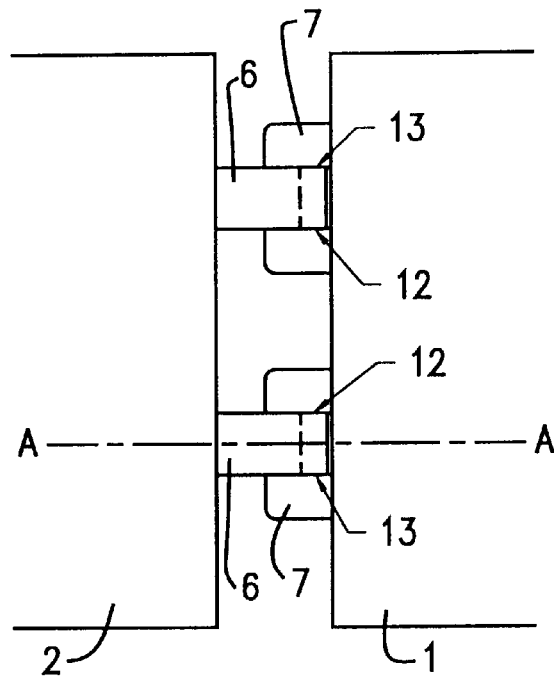
FIG. 2 is a plan view of the coupling between the main trolley and the trailer of the cleaning trolley shown in FIG. 1.
Figure 3:
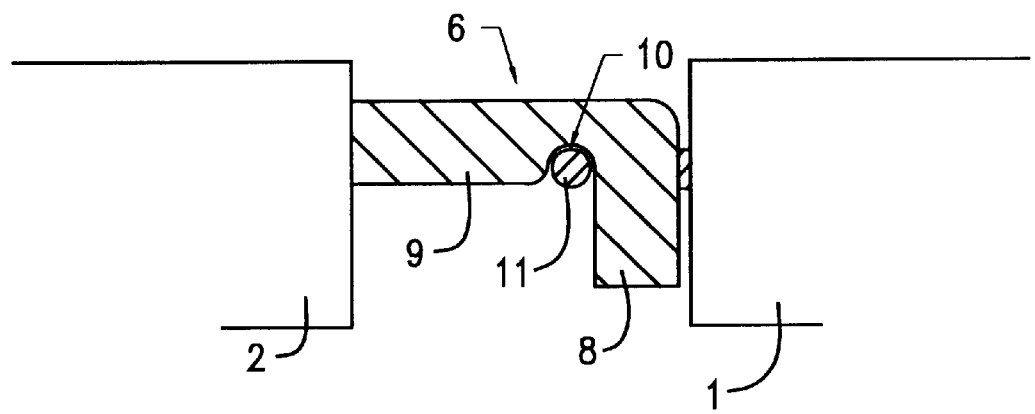
FIG. 3 is a section on the line A—A of the coupling shown in FIG. 2 in the unfolded position of the trailer.
Figure 4:
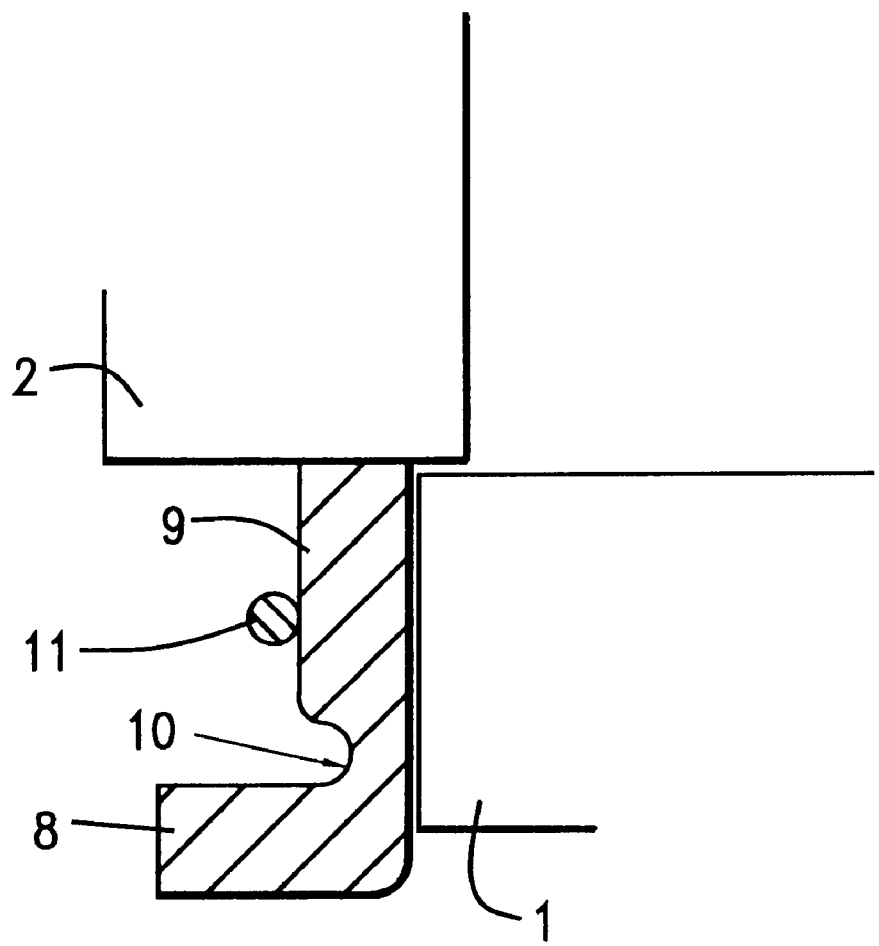
FIG. 4 is a section on the line A—A of the coupling shown in FIG. 2 in the folded position of the trailer.

The trailer 2 is connected to the main trolley 1 by a coupling shown in detail in FIGS. 2 to 4. The coupling 5 is made up of two coupling hooks 6 of the trailer 2 and two coupling eyes 7 of the main trolley 1. In the unfolded position, the coupling hook 7, which is L-shaped in cross-section, engages with its shorter end 8 in the opening of the coupling eye 7, as shown in FIG. 3. The cross-section of the shorter end 8 corresponds to the opening cross-section of the coupling eye 7 so that the trailer 2 is unable to move and, in particular, swing out relative to the main trolley 1 in the plane of travel. A groove 10, in which the rear end 11 of the coupling eye 7 fits, is disposed between the shorter end 8 and the longer end 9, the stay, by which the coupling hook 6 is fixed to the trailer 2. The trailer 2 is thus able to turn about the longitudinal axis of the rear end 11 of the main trolley 1.

The cross-section of the stay 9 of the coupling hook 6 also corresponds to the opening width of the coupling eye 7. In this way, the trailer 2 can be folded up and, at the same time, shut in on the main trolley 1, as shown in FIG. 4.

LIST OF REFERENCE NUMERALS

1 Main trolley
2 Trailer
3 Chassis
4 Casters
5 Coupling
6 Coupling hook
7 Coupling eye
8 Shorter end
9 Longer end, stay
10 Groove
11 Rear end
12 (Inner) side face of the coupling hook; inner face of the coupling eye; inner interval
13 (Outer) side face of the coupling hook; inner face of the coupling eye; outer interval

What is claimed is:

1. A cleaning trolley suitable for accommodating and transporting containers and utensils for the institutional cleaning and disinfection of floors and other surfaces, comprising:

a main trolley with wheels, said main trolley having a front end, a rear end, and a longitudinal axis between and perpendicular to the front and rear ends;

a trailer with wheels;

a coupling for connecting the trailer to the main trolley, said coupling including at least one L-shaped coupling hook and at least one corresponding coupling eye, respectively, a said coupling hook being designed to engage proximate an inside corner of its L-Shape an associated coupling eye, when said trailer is in use;

the shape of a said coupling hook and associated coupling eye being configured to provide upon coupling therebetween, the following:

means for allowing the trailer to make a turning movement with respect to said trolley to follow turning movement of the rear end of the main trolley around a laterally extending axis;

means for allowing the trailer vertical movement relative to the main trolley;

means for maintaining the distance between said main trolley and said trailer; and means for allowing the trailer, when not in use, to be folded upward with its longitudinal axis vertically oriented, for rigidly locking said coupling hook into said coupling eye, for keeping said trailer in a locked storage position while substantially preventing independent movement thereof upon the rear end of the main trolley.

2. A cleaning trolley as claimed in claim 1, wherein the trailer includes at least two casters arranged adjacent to and at a distance from one another, said two casters being aligned for travel parallel to the longitudinal axis of said trolley, when moving in a straight path, and at a distance from one another.

3. A cleaning trolley as claimed in claim 1 further including two coupling eyes in each of which an associated coupling hook is designed to engage.

4. A cleaning trolley as claimed in claim 1, wherein an end of said at least one coupling hook has a cross-section designated to engage in an associated coupling eye and corresponds to the opening cross-section of the associated coupling eye.

5. A cleaning trolley as claimed in claim 3, wherein the distance between mutually opposite side faces of said associated coupling hooks is substantially equal to the distance between inner faces of the coupling eyes which said side faces are opposite when the trailer is in a coupled position with the trolley.

6. A cleaning trolley as claimed in claim 5, wherein the distance between remote side faces of the coupling hooks is narrower than the distance between inner faces of associated coupling eyes, respectively, which are opposite said side faces in the coupled position of the trailer.

7. A cleaning trolley as claimed in claim 6, wherein an outer face of a said coupled hook and an inner face of an associated coupling eye have a non-circular horizontal cross-section.

8. A cleaning trolley as claimed in claim 7, wherein the outer face of said coupling hook and the inner face of the associated coupling eye have an elongated horizontal cross-section.

9. A cleaning Trolley as claimed in claim 8, wherein the coupling hook secured to a front end of the trailer is connected to a stay of which the thickness in the vertical direction is substantially equal to the opening width of the associated coupling eye.

10. A cleaning trolley as claimed in claim 8, wherein the coupling hook is connected to the trailer by a stay having a cross-section that widens conically towards the coupling hook but reaches the opening width of the associated coupling eye in the vicinity of the coupling hook.

11. A cleaning trolley as claimed in claim 9, wherein the coupling hook is L-shaped, a shorter end thereof being designed to engage in said associated coupling eye and pointing downwards in an unfolded position of the trailer, the longer end of the stay being fixedly connected to the trailer.

12. A cleaning trolley as claimed in claim 11, further including a groove in the inner face of the coupling hook between its longer end and the shorter end, the shape of an associated coupling eye of the main trolley being adapted to fit in the groove.

\* \* \* \* \*